(12) United States Patent
Gopinath Gowda et al.

(10) Patent No.: US 12,434,846 B2
(45) Date of Patent: Oct. 7, 2025

(54) BARTACK STITCHED PNEUMATIC DEICER BOOTS

(71) Applicant: Goodrich Corporation, Charlotte, NC (US)

(72) Inventors: Anvith BG Gopinath Gowda, Karnataka (IN); Shyam Kumar Dattatri, Karnataka (IN); Rhushikesh Patil, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/323,630

(22) Filed: May 25, 2023

(65) Prior Publication Data

US 2024/0300653 A1    Sep. 12, 2024

(30) Foreign Application Priority Data

Mar. 9, 2023 (IN) .............................. 202311015570

(51) Int. Cl.
  *B64D 15/16*   (2006.01)
  *B64F 5/10*   (2017.01)
(52) U.S. Cl.
  CPC .............. *B64D 15/166* (2013.01); *B64F 5/10* (2017.01)
(58) Field of Classification Search
  CPC ................................ B64D 15/166; B32B 7/09
  See application file for complete search history.

(56) References Cited

U.S. PATENT DOCUMENTS

| | | | |
|---|---|---|---|
| 3,690,601 A * | 9/1972 | Roemke | B64D 15/166 244/134 A |
| 4,361,298 A | 11/1982 | Trares et al. | |
| 4,463,919 A | 8/1984 | Bac | |
| 4,494,715 A | 1/1985 | Weisend, Jr. | |
| 4,561,613 A | 12/1985 | Weisend, Jr. | |
| 4,687,159 A | 8/1987 | Kageorge | |
| 4,779,823 A * | 10/1988 | Ely | B64D 15/166 244/134 A |
| 4,836,474 A * | 6/1989 | Briscoe | B64D 15/16 244/134 A |
| 4,961,549 A * | 10/1990 | LaRue | B64D 15/166 244/134 A |
| 5,098,037 A * | 3/1992 | Leffel | B64D 15/166 244/134 A |
| 5,112,011 A | 5/1992 | Weisend, Jr. et al. | |
| 5,310,142 A | 5/1994 | Weisend, Jr. | |

(Continued)

FOREIGN PATENT DOCUMENTS

DE    102004038559 A1    3/2006

OTHER PUBLICATIONS

European Search Report for Application No. 24162171.3, mailed Jun. 18, 2024, 5 pages.

*Primary Examiner* — William L Gmoser
(74) *Attorney, Agent, or Firm* — CANTOR COLBURN LLP

(57) ABSTRACT

The present disclosure provides for pneumatic deicer boot assemblies, and related methods of fabrication and use. More particularly, the present disclosure provides for bartack stitched pneumatic deicer boot assemblies for aircraft or the like, with the bartack stitched pneumatic deicer boot assemblies having an inflatable carcass formed by two layers (e.g., a stretchable layer and a non-stretchable layer) stitched together using bartack stitches.

16 Claims, 5 Drawing Sheets

(56) References Cited

U.S. PATENT DOCUMENTS

| | | | |
|---|---|---|---|
| 5,337,978 A | | 8/1994 | Fahrner et al. |
| 5,427,332 A | * | 6/1995 | Rauckhorst, III ..... B64D 15/16 |
| | | | 244/134 A |
| 5,544,845 A | | 8/1996 | Giamati et al. |
| 6,247,669 B1 | * | 6/2001 | Rauckhorst, III ... B64D 15/166 |
| | | | 244/134 A |
| 6,443,394 B1 | * | 9/2002 | Weisend, Jr. ........ B64D 15/166 |
| | | | 244/134 A |
| 9,598,176 B2 | * | 3/2017 | Giamati ................ G01R 31/54 |
| 9,994,324 B2 | | 6/2018 | Hu |
| 9,994,325 B2 | | 6/2018 | Hu |
| 10,640,217 B2 | * | 5/2020 | Botura ..................... B64F 5/60 |
| 10,669,034 B2 | | 6/2020 | Schomer |
| 10,780,983 B2 | | 9/2020 | Hunter et al. |
| 10,780,984 B2 | | 9/2020 | Fahrner et al. |
| 11,117,672 B2 | | 9/2021 | Giamati |
| 11,760,494 B2 | * | 9/2023 | Gutwein ................ B64D 15/20 |
| | | | 244/134 R |
| 2003/0122037 A1 | | 7/2003 | Hyde et al. |
| 2018/0273188 A1 | * | 9/2018 | Volny ..................... B63B 27/14 |

* cited by examiner

BARTACK STITCHED PNEUMATIC DEICER BOOTS

CROSS-REFERENCE TO RELATED APPLICATIONS

This application claims the benefit of priority to Indian Application No. 202311015570 filed Mar. 9, 2023, the disclosure of which is incorporated herein by reference in its entirety.

TECHNICAL FIELD

The present disclosure relates to pneumatic deicer boot assemblies and related methods of fabrication and use and, more particularly, to bartack stitched pneumatic deicer boot assemblies for aircraft or the like, with the bartack stitched pneumatic deicer boot assemblies having an inflatable carcass formed by two layers (e.g., a stretchable layer and a non-stretchable layer) stitched together using bartack stitches.

BACKGROUND

In general, pneumatic deicing boots are a category of ice protection systems installed on aircraft surfaces to facilitate mechanical deicing of accumulated ice on aircraft wings, propellers, wing tips, etc. Deicing boots are commonly installed on the aircraft wings leading edges and control surfaces (e.g., horizontal, and vertical stabilizer), propellers, wing tips, etc. These are the areas which favor ice to accumulate, and any ice accumulation can severely affect the aircraft's performance increasing drag, and at times can become catastrophic.

In service, at least two categories of defects can be observed in pneumatic deicers—internal defects and external defects. Internal defects can be thread failures at stitch lines, fabric failures at stitch lines, failures in-between layers (delaminations), etc. Thread failure is one of the predominant field failures observed, and this failure can render a pneumatic deicer irreparable, ultimately leading to the replacement of such pneumatic deicers.

External defects are mainly due to the exposure to harsh environments (e.g., including but not limited to, abrasive erosions, UV exposures, ozone exposures, ice, rain, heat and humidity, etc.). Due to such harsh exposures the outermost coating of the deicers starts to degrade, thereby requiring eventual replacement of the deicers.

BRIEF DESCRIPTION

The present disclosure provides for pneumatic deicer boot assemblies, and related methods of fabrication and use. More particularly, the present disclosure provides for bartack stitched pneumatic deicer boot assemblies for aircraft or the like, with the bartack stitched pneumatic deicer boot assemblies having an inflatable carcass formed by two layers (e.g., a stretchable layer and a non-stretchable layer) stitched together using bartack stitches.

The present disclosure provides for a pneumatic deicer boot assembly including a stretchable layer and a non-stretchable layer, the stretchable layer and the non-stretchable layer stitched together by a plurality of bartack stitches, the plurality of bartack stitches having airflow spacings between adjacent bartack stitches, and where the stretchable layer is configured to move from a deflated position to an inflated position via introduction of air to the airflow spacings to create a plurality of expanded air tubes, each expanded air tube positioned between adjacent bartack stitches and between the stretchable layer and the non-stretchable layer.

In addition to one or more of the features described, or as an alternative to any of the foregoing embodiments, the plurality of bartack stitches are stitched in a parallel line pattern.

In addition to one or more of the features described, or as an alternative to any of the foregoing embodiments, where each bartack stitch of the plurality of bartack stitches includes a zig-zag stitch and a straight stitch line within the zig-zig stitch.

In addition to one or more of the features described, or as an alternative to any of the foregoing embodiments, the non-stretchable layer is mounted with respect to a protected surface layer of an aircraft.

In addition to one or more of the features described, or as an alternative to any of the foregoing embodiments, the protected surface layer is a wing surface or a stabilizer surface of the aircraft.

In addition to one or more of the features described, or as an alternative to any of the foregoing embodiments, further including a natural rubber layer positioned on the stretchable fabric, and a weathering surface layer positioned on the natural rubber layer.

In addition to one or more of the features described, or as an alternative to any of the foregoing embodiments, the weathering surface layer is configured and dimensioned to allow an ice layer to accumulate thereon.

In addition to one or more of the features described, or as an alternative to any of the foregoing embodiments, further including an installation rubber layer positioned on a protected surface layer of an aircraft, with the non-stretchable fabric positioned on the installation rubber layer.

In addition to one or more of the features described, or as an alternative to any of the foregoing embodiments, where each bartack stitch of the plurality of bartack stitches includes stitch ends that are reinforced.

In addition to one or more of the features described, or as an alternative to any of the foregoing embodiments, the stretchable layer in the inflated position breaks-up ice on an ice layer positioned relative to the stretchable layer.

The present disclosure provides for a method for fabricating a pneumatic deicer boot including providing a stretchable layer and a non-stretchable layer, stitching the stretchable layer and the non-stretchable layer together by a plurality of bartack stitches, the plurality of bartack stitches having airflow spacings between adjacent bartack stitches, and introducing air to the airflow spacings to move the stretchable layer from a deflated position to an inflated position to create a plurality of expanded air tubes, each expanded air tube positioned between adjacent bartack stitches and between the stretchable layer and the non-stretchable layer.

In addition to one or more of the features described, or as an alternative to any of the foregoing embodiments, the plurality of bartack stitches are stitched in a parallel line pattern.

In addition to one or more of the features described, or as an alternative to any of the foregoing embodiments, where each bartack stitch of the plurality of bartack stitches includes a zig-zag stitch and a straight stitch line within the zig-zig stitch.

In addition to one or more of the features described, or as an alternative to any of the foregoing embodiments, the non-stretchable layer is mounted with respect to a protected surface layer of an aircraft.

In addition to one or more of the features described, or as an alternative to any of the foregoing embodiments, the protected surface layer is a wing surface or a stabilizer surface of the aircraft.

In addition to one or more of the features described, or as an alternative to any of the foregoing embodiments, further including a natural rubber layer positioned on the stretchable fabric, and a weathering surface layer positioned on the natural rubber layer.

In addition to one or more of the features described, or as an alternative to any of the foregoing embodiments, the weathering surface layer is configured and dimensioned to allow an ice layer to accumulate thereon.

In addition to one or more of the features described, or as an alternative to any of the foregoing embodiments, further including an installation rubber layer positioned on a protected surface layer of an aircraft, with the non-stretchable fabric positioned on the installation rubber layer.

In addition to one or more of the features described, or as an alternative to any of the foregoing embodiments, where each bartack stitch of the plurality of bartack stitches includes stitch ends that are reinforced.

In addition to one or more of the features described, or as an alternative to any of the foregoing embodiments, the stretchable layer in the inflated position breaks-up ice on an ice layer positioned relative to the stretchable layer.

The above described and other features are exemplified by the following figures and detailed description.

Any combination or permutation of embodiments is envisioned. Additional features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
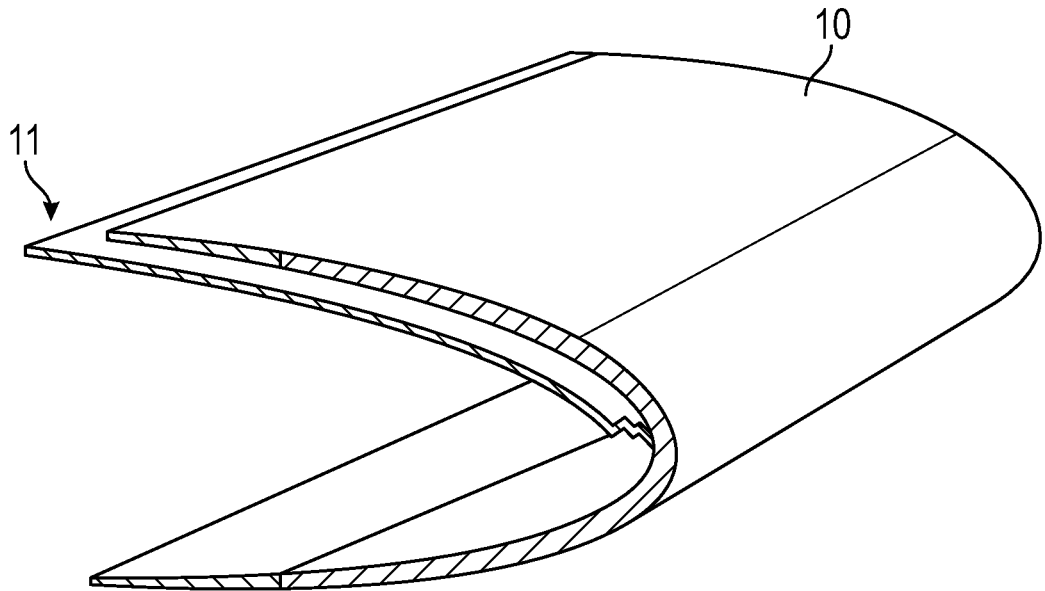
Figure 2:
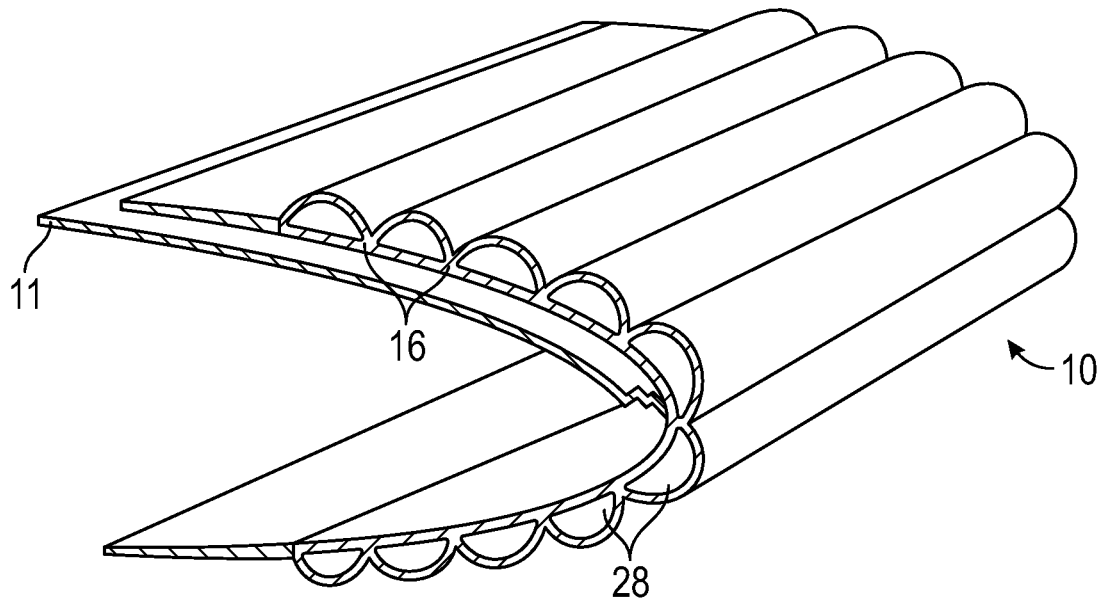
Figure 3:
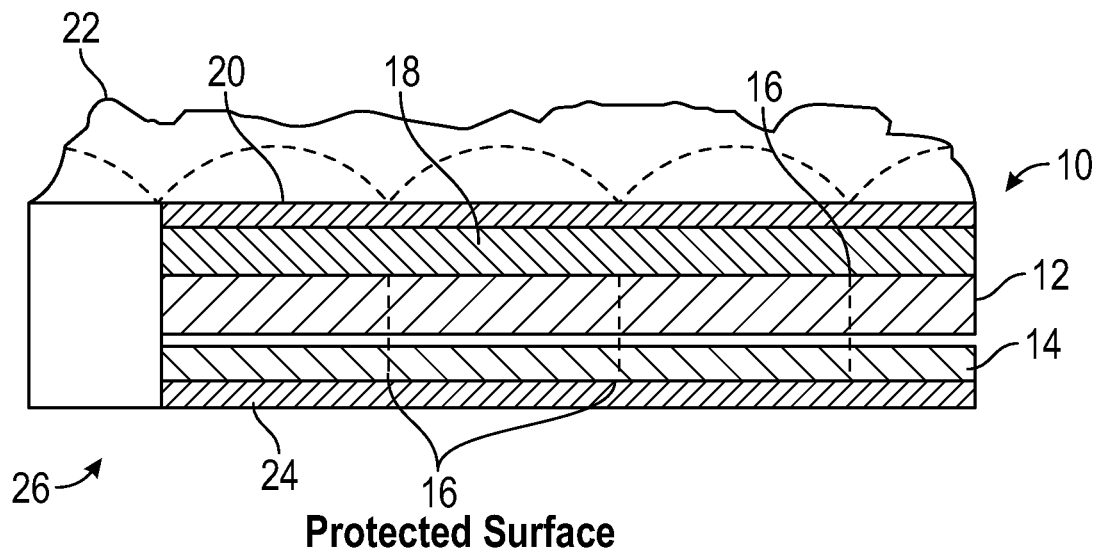
Figure 4:
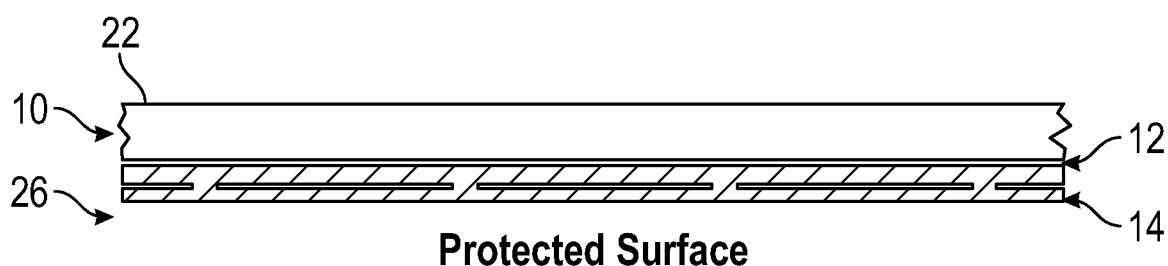
Figure 5:
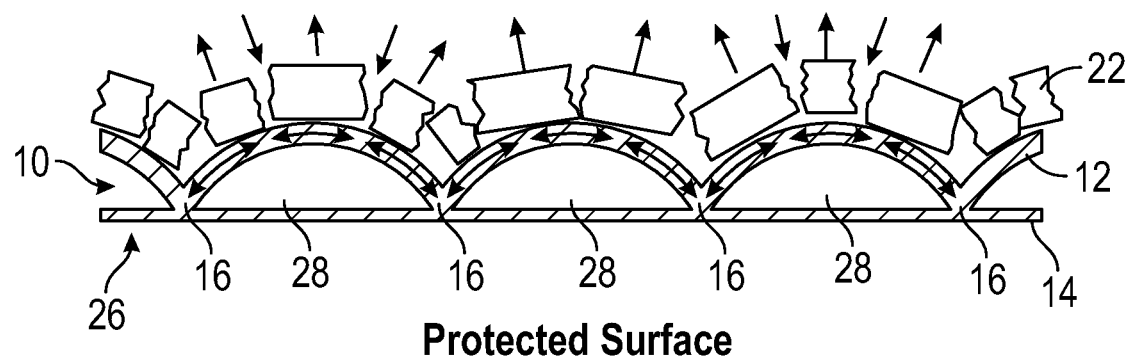
Figure 6:
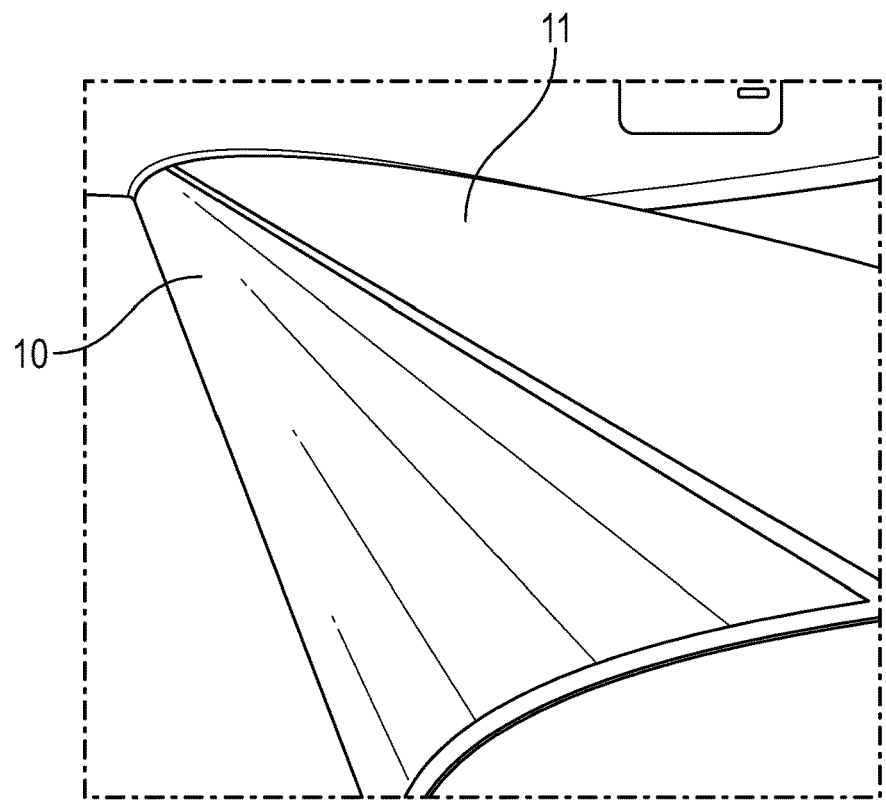
Figure 7:
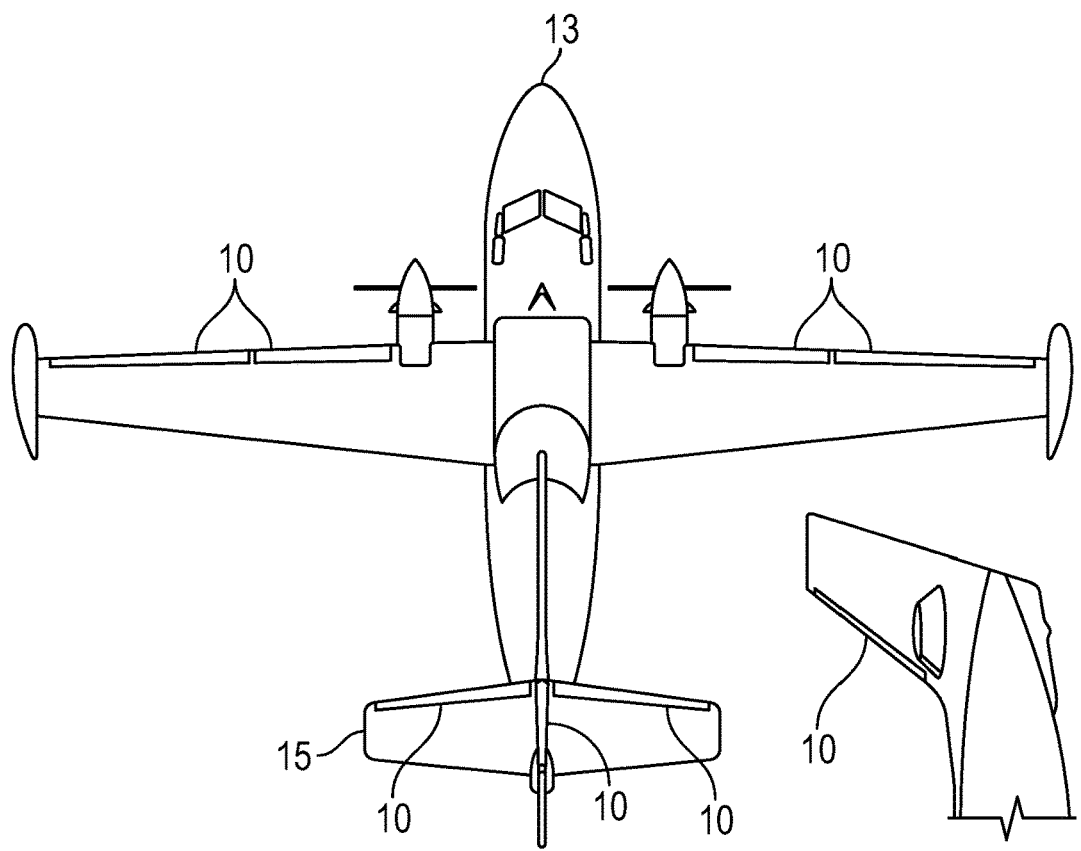
Figure 8:
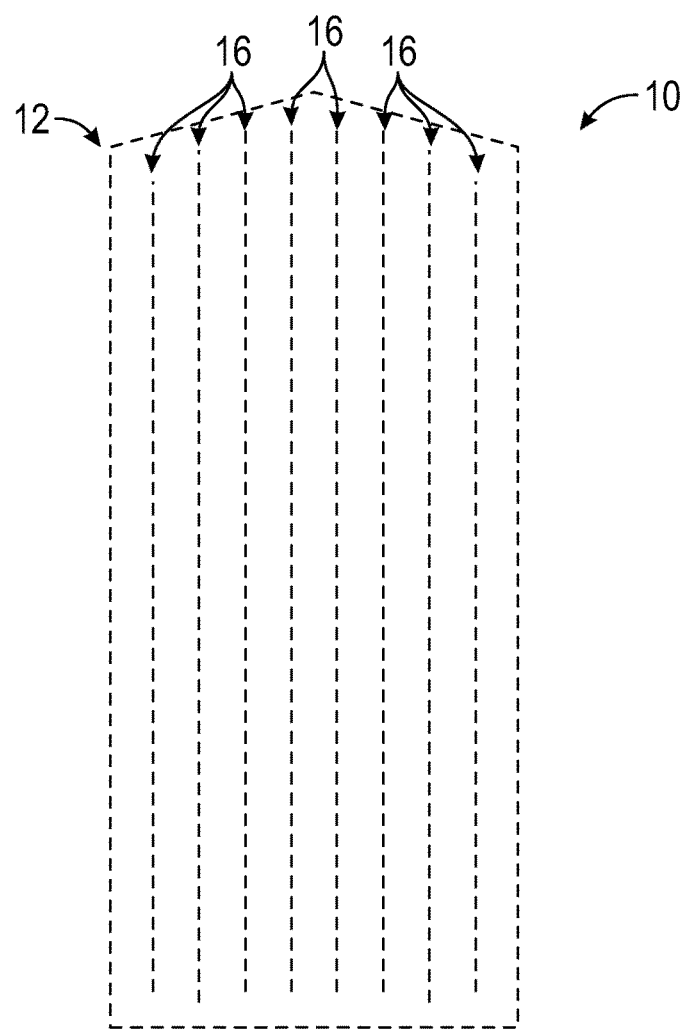
Figure 9:
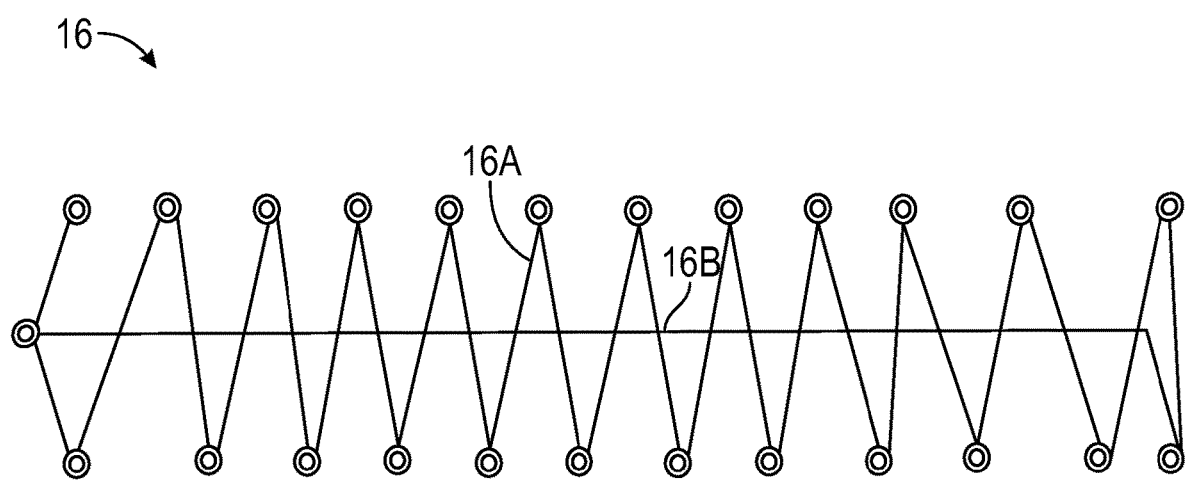
Figure 10:
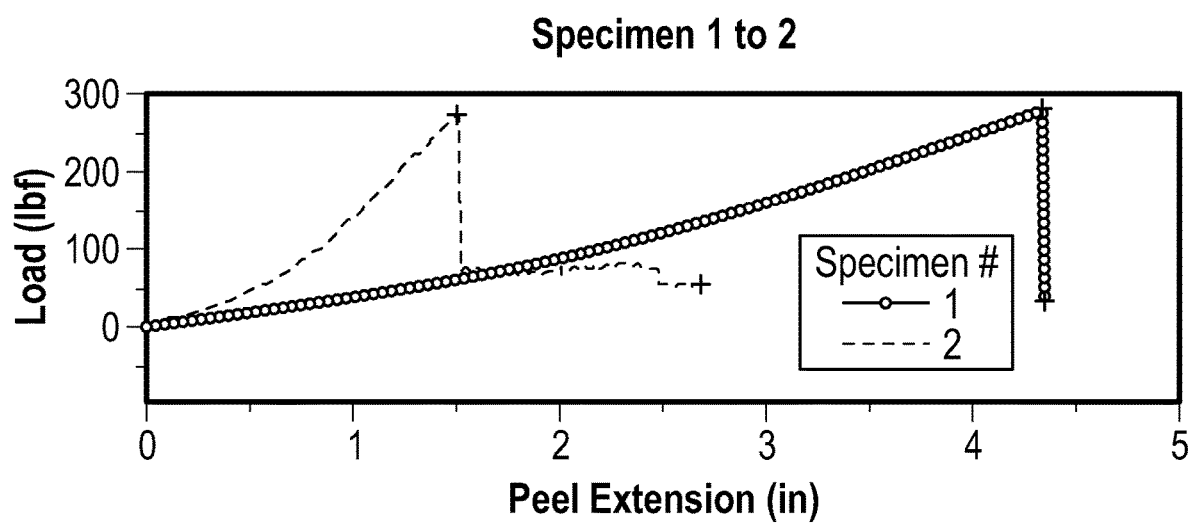

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 1 is a side perspective view of an example bartack stitched pneumatic deicer boot assembly in the deflated position, according to the present disclosure;

FIG. 2 is a side perspective view of an example bartack stitched pneumatic deicer boot assembly in the inflated position;

FIG. 3 is a cross-sectional side view of an example bartack stitched pneumatic deicer boot assembly in the deflated position;

FIG. 4 is a side perspective view of an example bartack stitched pneumatic deicer boot assembly in the deflated position;

FIG. 5 is a side perspective view of an example bartack stitched pneumatic deicer boot assembly in the inflated position (e.g., assembly is inflated to break-up ice accumulated on ice layer);

FIG. 6 is a side perspective view of an example bartack stitched pneumatic deicer boot assembly positioned on a wing of an aircraft;

FIG. 7 is a schematic of an aircraft with example bartack stitched pneumatic deicer boot assemblies positioned on various locations of the aircraft;

FIG. 8 is a schematic of an example stitch pattern of a bartack stitched pneumatic deicer boot assembly, according to the present disclosure;

FIG. 9 is a schematic of an example bartack stitch of a bartack stitched pneumatic deicer boot assembly, according to the present disclosure; and FIG. 10 is a graph showing pull test results of two bartack stitched fabric specimens.

DETAILED DESCRIPTION

The example embodiments disclosed herein are illustrative of bartack stitched pneumatic deicer boot assemblies for aircraft, and systems of the present disclosure and methods/techniques thereof. It should be understood, however, that the disclosed embodiments are merely examples of the present disclosure, which may be embodied in various forms. Therefore, details disclosed herein with reference to example bartack stitched pneumatic deicer boot assemblies and associated processes/techniques of fabrication/assembly and use are not to be interpreted as limiting, but merely as the basis for teaching one skilled in the art how to make and use the systems/assemblies and/or alternative systems/assemblies of the present disclosure.

The present disclosure provides for pneumatic deicer boot assemblies, and related methods of fabrication and use. More particularly, the present disclosure provides for bartack stitched pneumatic deicer boot assemblies for aircraft or the like, with the bartack stitched pneumatic deicer boot assemblies having an inflatable carcass formed by two layers (e.g., a stretchable layer and a non-stretchable layer) stitched together using bartack stitches.

Current practice provides that due to the continuous use of pneumatic deicers on an aircraft under icing conditions, the threads used to mechanically join the inflatable carcass of a pneumatic deicer are subjected to tremendous cyclic stress due to a series of inflations and deflations, and fatigue develops on the threads and gradually the threads experience failure. This can lead to, depending on the extent of the thread failure, an area of the pneumatic deicer becoming inefficient to expel accumulated ice on the control surface of an aircraft where such pneumatic deicers are mounted. This can turn catastrophic if the threads fail in larger portions of the pneumatic deicer, thereby significantly reducing the intended function of the deicers.

In general, pneumatic deicers can be made of two types of coated fabrics, a stretchable fabric and a non-stretchable fabric. The non-stretchable fabric is stitched onto the stretchable fabric at regular intervals based on the pneumatic deicer design and considering the maximum ice removal. Increasing the seam strength of the stitches used in the pneumatic deicer can avoid the deicer failure due to thread failures at the stitch lines.

FIG. 1 is a side perspective view of an example bartack stitched pneumatic deicer boot assembly 10 of the present disclosure, with the bartack stitched pneumatic deicer boot assembly 10 positioned on a wing 11 of an aircraft. FIG. 2 is a side perspective view of the example bartack stitched pneumatic deicer boot assembly 10 in the inflated position.

In general and as discussed further below, pneumatic deicer boot assembly 10 is a bartack stitched pneumatic deicer boot assembly 10 for aircraft or the like, with the bartack stitched pneumatic deicer boot assembly 10 having an inflatable carcass (e.g., comprising a plurality of expanded air tubes 28—discussed below) formed by two layers, a stretchable layer 12 and a non-stretchable layer 14 stitched together using bartack stitches 16.

FIG. 3 is a cross-sectional side view of an example bartack stitched pneumatic deicer boot assembly 10 in the deflated position. As shown in FIG. 3, the stretchable layer 12 can include a stretchable fabric 12 (e.g., nylon with natural rubber) stitched to a non-stretchable fabric 14 (e.g., nylon with natural rubber) using bartack stitches 16.

As shown in FIG. 3, a natural rubber layer 18 can be positioned on the stretchable fabric 12, and a weathering surface layer 20 (e.g., neoprene or polyurethane layer 20) can be positioned on the natural rubber layer 18. In general, weathering surface layer 20 is configured and dimensioned to allow an ice layer 22 to accumulate thereon (e.g., when assembly 10 is in the deflated position).

An installation rubber layer 24 (e.g., neoprene layer 24) can be positioned on a protected surface layer 26 (e.g., protected surface layer 26 of a wing 11 of an aircraft), with the non-stretchable fabric 14 positioned on the installation rubber layer 24.

FIG. 4 is a side perspective view of an example bartack stitched pneumatic deicer boot assembly 10 in the deflated position. FIG. 5 is a side perspective view of an example bartack stitched pneumatic deicer boot assembly 10 in the inflated position (e.g., assembly 10 is inflated to break-up ice accumulated on ice layer 22). FIG. 6 is a side perspective view of an example bartack stitched pneumatic deicer boot assembly 10 positioned on a wing 11 of an aircraft. FIG. 7 is a schematic of an aircraft with example bartack stitched pneumatic deicer boot assemblies 10 positioned on various locations of an aircraft 13 (e.g., on wings 11 and stabilizers 15).

FIG. 8 is a schematic of an example stitch pattern of a bartack stitched pneumatic deicer boot assembly 10, with the stitch pattern including a plurality of bartack stitches 16.

The present disclosure provides a method of stitching a pneumatic deicer boot assembly 10 where the inflatable carcass of the assembly 10, formed by the stretchable layer 12 and the non-stretchable layer 14, is stitched together using bartack stitches 16. This change in stitch pattern utilizing the plurality of bartack stitches 16 in the assembly 10 increases the seam strengths of the stiches 16 of the assembly 10.

As shown in FIG. 9, in a bartack stitch 16, a zig-zag stitch 16A is made along with a straight stitch line 16B within the zig-zig stitch 16A, thus increasing the stitches 16 per inch in the stitch pattern of the assembly 10.

In example embodiments, the process is achieved by a programmable sewing machine that can stitch the stretchable layer 12 to the non-stretchable layer 14 using bartack stitches 16 with predetermined stitches 16 per inch. The fabrics 12, 14 can be either manually stitched, or the fabrics 12, 14 of the inflatable carcass can be laid out on a table with a fully automated sewing machine stitching the stitches 16 in controlled maneuvers. Either of these methods can take into consideration the thickness of the fabrics 12, 14 and the stitches 16 per inch that should be stitched. It is noted that when one increases the number of stitches 16 per inch on the fabrics 12, 14, then due to the increased thread holes the fabric 12, 14 strength gets reduced, while simultaneously the seam strength increases. Using bartack stitches 16 with an optimum number of stitches 16 per inch, the desired cumulative strength of the stitched deicer assembly 10 can be achieved.

As shown in FIG. 8, the bartack stitches 16 can be stitched in a parallel line pattern on the pneumatic deicer assembly 10, with the stitch ends reinforced. The bartack stitches 16 allow for the air to flow between the tubes 28 (e.g., expanded air tubes 28—FIGS. 2 and 5) of stitched fabrics 12, 14 during inflation and deflation of the pneumatic deicer assembly 10. The plurality of bartack stitches 16 can have airflow spacings between adjacent bartack stitches 16. The increased number of bartack stitches 16 per inch in the bartack stitched pneumatic deicer assembly 10 can substantially eliminate the chances of failure of the pneumatic deicer assembly 10 on the stitched lines of stitches 16.

In sewing, bartack, also called bar-tack or bartack, refers to a series of stitches used to reinforce areas of a garment/fabric that may be subject to stress or additional wear. Typical areas for bartack stitches include pocket openings, belt loops, buttonholes, the bottom of a fly opening, tucks, pleats and the corners of collars. Bartacks may be sewn by hand, using whip stitches, or by machine, using zigzag stitches. The process for sewing a bartack is essentially to sew several long, narrowly-spaced stitches along the line of the bar that will be formed, followed by short stitches made perpendicular to the long stitches, through the fabric and over the bar. In the case of a pneumatic deicer assembly 10, the length of the stitch 16 can be increased to the length of the pneumatic deicer assembly 10. This can be achieved by customizing or programming the automatic or manual sewing machine to achieve the desired length of the stitch lines 16.

In example embodiments, the bartack stitched pneumatic deicer boot assembly 10 has a series of straight bartack stitches 16 with spacing for air flow. Air enters the bartack stitched pneumatic deicer boot assembly 10 through an air connection and flows through the tubes 28 created by stitched fabrics 12, 14, and flows through the tubes 28 as well as between the tubes 28 via the stitches 16. As noted, the plurality of bartack stitches 16 can have airflow spacings between adjacent bartack stitches 16.

At least four factors that determine the strength of a seam can include: (i) fabric type, weight, strength, durability; (ii) thread fiber type, construction, and size; (iii) stitch and seam construction; and (iv) stitches per inch. Any one of these factors can adversely affect the performance of a sewn product depending on the end-use of the sewn product.

An estimated seam strength formula has been developed for woven seams where one piece of fabric is placed on top of another with a specific seam margin. The formula for estimating seam strength on woven fabrics is as follows:

$$\text{Estimated Seam Strength} = \text{Stitches Per Inch (SPI)} \times \text{Thread Strength (lbs.)} \times \text{Seam Factor}.$$

In the above formula, Seam Factor is a factor based on the average loop strength ratio of most sewing threads.

From this formula, one can see the impact that stitches per inch, thread strength and stitch selection have on the strength of the seam. Generally, the more stitches per inch, the greater the seam strength. There are rare cases where adding stitches per inch can actually damage the fabric so that the seam is weakened, however, this only happens on specific fabrics that can be damaged by excessive needle penetrations.

Through experimentation the optimum number of stitches 16 per inch and width of the bartack stitch 16 can be determined for a given fabric in the pneumatic deicer assembly 10. Pull tests of the bartack stitched fabrics 12, 14 can be performed to verify that seam strength of the bartack stitch 16 is greater than the strength of the fabric 12, 14, as in general cases with optimum stitches per inch the fabric ruptures or fails at maximum load before the bartack stitch 16 fails. FIG. 10 is a graph showing pull test results of two bartack stitched fabric specimens.

Example designs of the present disclosure involve mechanically sewing the two layers of fabrics 12, 14 with single, double or zig-zag stitches to form a plurality of inflatable tubes 28, later sandwiched between various layers of elastomers to form a pneumatic deicer boot assembly 10 (e.g., a form of aircraft ice protection system). The sewing process involves two fabrics 12, 14 laid out on top of a sewing table and the sewing machine's needle head moving in a designated maneuver to stitch the fabrics 12, 14 together.

The threads of stitches 16 should be carefully terminated using various designed methods to ensure unraveling is prevented during usage on an aircraft.

Conventional practice provides that other mechanically sewn pneumatic deicer assemblies when used on an aircraft, over a period of time can experience multiple reported field issues of thread failure or stitch failure, rendering the failure portion of the product ineffective for expelling accumulated ice.

The example bartack stitched pneumatic deicer boot assemblies 10 of the present disclosure can be stitched manually or by automated sewing machine, and where the length of the stitch 16 is customized for the desired deicer assembly 10 length. The fabrics 12, 14 in the deicer assembly 10 can be placed on the stitching table. The stitches 16 can be made in straight lines and reinforced with additional stitches in its ends to ensure unraveling is prevented during usage on an aircraft. An example bartack stitch 16 for optimum strength in the pneumatic deicer assembly 10 is shown in FIG. 9.

There are many benefits of the assemblies, systems and methods of the present disclosure, including, without limitation, bartack stitching 16 for the entire length of the deicer assembly 10; providing a process of stitching bartack stitches 16 along stitch lines to manufacture a deicer boot assembly 10; higher/improved seam strength and higher/improved factors of safety can be experienced in the pneumatic deicer assemblies 10 with bartack stitches 16 when compared with single stitch, double stitch and zig zag stitches; greater endurance life of the pneumatic deicer assembly 10 due to the elimination of stitch failure; stitching lead time is decreased as single straight lines of each stitch 16 is required for each tube 28; and/or provides opportunity to develop new bartack stitch 16 patterns for pneumatic deicer boot assemblies 10.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the assemblies, systems and methods of the present disclosure have been described with reference to example embodiments thereof, the present disclosure is not limited to such example embodiments and/or implementations. Rather, the assemblies, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A pneumatic deicer boot assembly comprising:
   fabric layers consisting of:
   a stretchable layer formed of a stretchable fabric; and
   a non-stretchable layer formed of a non-stretchable fabric,
   wherein the stretchable layer and the non-stretchable layer are stitched together by stitches consisting of bartack stitches,
   wherein:
   each one of the bartack stitches is defined by a zig-zag stitch A and a straight stitch line B within the zig-zig stitch; and
   wherein the bartack stitches are stitched in a pattern consisting of a parallel line pattern, such that the bartack stitches define airflow spacings between adjacent ones of the bartack stitches;

wherein:
the stretchable layer is configured to expand from a deflated position to an inflated position via introduction of air to the airflow spacings to create expanded air tubes, wherein the expanded air tubes, end to end, have a same cross-sectional shape as each other and extend parallel with each other,
each one of the expanded air tubes is positioned between adjacent ones of the bartack stitches and between the stretchable layer and the non-stretchable layer.

2. The assembly of claim 1, wherein the non-stretchable layer is mounted with respect to a protected surface layer of an aircraft.

3. The assembly of claim 2, wherein the protected surface layer is a wing surface or a stabilizer surface of the aircraft.

4. The assembly of claim 1, further comprising a natural rubber layer positioned on the stretchable fabric, and a weathering surface layer positioned on the natural rubber layer.

5. The assembly of claim 4, wherein the weathering surface layer is configured and dimensioned to allow an ice layer to accumulate thereon.

6. The assembly of claim 1, further comprising an installation rubber layer positioned on a protected surface layer of an aircraft, with the non-stretchable fabric positioned on the installation rubber layer.

7. The assembly of claim 1, wherein each one of the bartack stitches includes stitch ends that are reinforced.

8. The assembly of claim 1, wherein the stretchable layer in the inflated position breaks-up ice on an ice layer positioned relative to the stretchable layer.

9. A method for fabricating a pneumatic deicer boot comprising:
providing fabric layers consisting of a stretchable layer formed of a stretchable fabric and a non-stretchable layer formed of a non-stretchable fabric,
stitching the stretchable layer and the non-stretchable layer together by stitches consisting of bartack stitches, wherein:
each one of the bartack stitches is defined by a zig-zag stitch A and a straight stitch line B within the zig-zig stitch; and
the bartack stitches are stitched in a pattern consisting of a parallel line pattern, such that bartack stitches define airflow spacings between adjacent ones of the bartack stitches; and
introducing air to the airflow spacings to expand the stretchable layer from a deflated position to an inflated position to create a plurality of expanded air tubes, wherein the expanded air tubes, end to end, have a same cross-sectional shape as each other and extend parallel with each other,
each one of the expanded air tubes is positioned between adjacent ones of the bartack stitches and between the stretchable layer and the non-stretchable layer.

10. The method of claim 9, wherein the non-stretchable layer is mounted with respect to a protected surface layer of an aircraft.

11. The method of claim 10, wherein the protected surface layer is a wing surface or a stabilizer surface of the aircraft.

12. The method of claim 9, further comprising a natural rubber layer positioned on the stretchable fabric, and a weathering surface layer positioned on the natural rubber layer.

13. The method of claim 12, wherein the weathering surface layer is configured and dimensioned to allow an ice layer to accumulate thereon.

14. The method of claim 9, further comprising an installation rubber layer positioned on a protected surface layer of an aircraft, with the non-stretchable fabric positioned on the installation rubber layer.

15. The method of claim 9, wherein each one of the bartack stitches includes stitch ends that are reinforced.

16. The method of claim 9, wherein the stretchable layer in the inflated position breaks-up ice on an ice layer positioned relative to the stretchable layer.

* * * * *